United States Patent [19]

Baumel et al.

[11] 3,854,004

[45] Dec. 10, 1974

[54] INFORMATION STORAGE AND RETRIEVAL SYSTEM

[75] Inventors: Irwin D. Baumel, Jericho; Nathan A. Moerman, Roslyn Heights, Long Island; Attilio A. De Meo, Brooklyn, all of N.Y.

[73] Assignee: Sanders Associates, Inc., Nashua, N.H.

[22] Filed: May 20, 1968

[21] Appl. No.: 730,246

[52] U.S. Cl. ............ 178/6, 178/DIG. 1, 179/2 CA, 340/174.1 C

[51] Int. Cl. ........................ G11b 1/02, G11b 23/02

[58] Field of Search ............ 178/6, 6.8, 6.7, DIG. 1; 179/2, 2 CA; 340/149 A, 174.1 C

[56] References Cited

UNITED STATES PATENTS

| | | | |
|---|---|---|---|
| 2,650,830 | 9/1953 | Potter | 340/174.1 C |
| 2,680,148 | 6/1954 | Purington | 178/6.7 |
| 2,722,676 | 11/1955 | Begun | 340/174.1 C |
| 2,902,329 | 9/1959 | Brink | 340/174.1 C |
| 2,923,921 | 2/1960 | Shapin | 178/6 |
| 2,940,068 | 6/1960 | Stiefel | 340/174.1 C |
| 2,994,740 | 8/1961 | Conkwright | 178/6 |
| 3,050,579 | 8/1962 | Nash | 178/6 |
| 3,176,279 | 3/1965 | Lin | 340/174.1 C |
| 3,221,304 | 11/1965 | Enikeieff | 340/149 A |
| 3,276,002 | 9/1966 | Handley | 340/174.1 C |
| 3,299,418 | 1/1967 | Treseder | 178/6 |
| 3,308,451 | 3/1967 | Blackley | 340/174.1 C |
| 3,514,769 | 6/1970 | Woods | 340/174.1 C |
| 3,539,715 | 11/1970 | Lemelson | 178/6 |

*Primary Examiner*—Benedict V. Safourek
*Assistant Examiner*—Michael A. Masinick
*Attorney, Agent, or Firm*—Louis Etlinger; William L. Hunter

[57] ABSTRACT

The specific information storage and retrieval system described herein stores 49,000 microfiches in a central file, any one of which may be viewed in a matter of seconds. More specifically, the central file uses an arrangement of 20 shelves mounted on a closed loop track, each holding 2,450 microfiches, each microfiche in turn having 50 or 60 separate images. When a particular microfiche is selected, the proper shelf is rotated into a predetermined position. Concurrently a viewing station including a transducer such as a film camera or a television camera is brought adjacent to the selected microfiche which is partially extracted from its storage location so as to be viewed by the transducer.

2 Claims, 35 Drawing Figures

INVENTORS
IRWIN D. BAUMEL
NATHAN A. MOERMAN
ATTILIO A. DE MEO
BY
W. L. Hunter
ATTORNEY

*INVENTORS*
IRWIN D. BAUMEL
NATHAN A. MOERMAN
ATTILIO A. DE MEO
*BY*
W. L. Hunter
*ATTORNEY*

INVENTORS
IRWIN D. BAUMEL
NATHAN A. MOERMAN
ATTILIO A. DE MEO
BY
W. L. Austin
ATTORNEY

PATENTED DEC 10 1974 3,854,004

SHEET 04 OF 13

INVENTORS
IRWIN D. BAUMEL
NATHAN A. MOERMAN
ATTILIO A. DE MEO
BY
W. L. Hunter
ATTORNEY

INVENTORS
IRWIN D. BAUMEL
NATHAN A. MOERMAN
ATTILIO A. DE MEO

BY W. L. Hunter
ATTORNEY

INVENTORS
IRWIN D. BAUMEL
NATHAN A. MOERMAN
ATTILIO A. DE MEO

BY W. L. Hunter
ATTORNEY

INVENTOR
IRWIN D. BAUMEL
NATHAN A. MOERMAN
ATTILIO A. DE MEO
BY
W. L. Hunter
ATTORNEY

INVENTORS
IRWIN D. BAUMEL
NATHAN A. MOERMAN
ATTILIO A. DE MEO

BY W. L. Hunter

ATTORNEY

PATENTED DEC 10 1974 3,854,004

INVENTORS
IRWIN D. BAUMEL
NATHAN A. MOERMAN
ATTILIO A. DE MEO

BY W. L. Hunter
ATTORNEY

INVENTOR
IRWIN D. BAUMEL
NATHAN A. MOERMAN
ATTILIO A. DE MEO
BY
W. L. Hunter
ATTORNEY

PATENTED DEC 10 1974

3,854,004

INVENTORS
IRWIN D. BAUMEL
NATHAN A. MOERMAN
ATTILIO A. DE MEO

BY W. L. Hunter
ATTORNEY

INVENTORS
IRWIN D. BAUMEL
NATHAN A. MOERMAN
ATTILIO A. DE MEO

BY W. L. Hunter

ATTORNEY

INVENTOR
IRWIN D. BAUMEL
NATHAN A. MOERMAN
ATTILIO A. DE MEO

BY

W. L. Hunter

ATTORNEY

INFORMATION STORAGE AND RETRIEVAL SYSTEM

FIELD OF THE INVENTION

This invention relates generally to information retrieval systems and particularly to such systems in which information stored on many documents in a central file may be retrieved automatically.

BACKGROUND

Vast quantities of information are being generated during the day to day operations of modern business and government facilities. Efficient operation of such facilities requires that this information be stored safely and efficiently yet be readily available for use. One approach to the problem is to record the information on microforms of one kind or another, so as to minimize the storage space required, and to store the microforms in a central file where they may be kept safe from accidental damage and unauthorized removal. When access to any of the information is required, the pertinent microform is removed from its place in the file and transported, preferably automatically, to a viewing station. There it may be viewed directly or by a television camera so as to transmit an image to a remote location.

Information retrieval systems based on the above approach, although generally satisfactory, have been subject to a number of disadvantages. For example, whenever a microform is abstracted from its place,, the integrity of the file is jeopardized. There is always the danger that the microform will not be returned, or, what may be worse, that it will be returned to the wrong place. In either case the stored information may, for all practical purposes, be lost. As another example, there is a practical limit as to how far a microform can be transported from its storage location to the viewing station. As the number of documents to be stored increases, it is necessary to provide additional viewing stations and transporting mechanisms. As yet another example, only one person can use the file at any one time. If that person needs to study a document carefully, the entire file is tied up while he is examining a single item.

It is a general object of the present invention to provide an improved information storage and retrieval method and apparatus.

Another object is to provide an information storage and retrieval system in which information stored at a central location can be retrieved both locally and at a number of remote locations.

Another object is to provide an information storage and retrieval method and system in which the stored information may be retrieved without jeopardizing the integrity of the file.

Another object is to provide an information storage and retrieval system in which a single retrieval mechanism serves a very large number of stored records.

Another object is to provide an information storage and retrieval system in which a viewer may study the contents of a record at length yet release the file for the use of others while he is doing so.

SUMMARY OF THE INVENTION

Briefly stated, the integrity of the file is preserved by limiting the withdrawal of the selected record to a position at which it or its container remains partiallly in the file, thus preserving its place and insuring its return to the proper location. This feature is made possible by the additional feature of transporting the viewing station including the withdrawal mechanism to the record instead of transporting the record to the viewing station. These features also allow great storage density.

At the viewing station the stored information is "read" from the record, either directly or with the aid of an optical, magnetic or other transducer suited to the form in which the information is recorded.

The release of the file while a record is being studied is made possible by a "buffering" device. In systems which include several remotely located stations viewing an image of the record by closed circuit television, the buffer may be apparatus which stores and recirculates the television signal to the monitor or may be an imaging device which makes a print of the record at once either from the visual image or from the television signal.

THE DRAWING

For a clearer understanding of the invention, reference may be made to its following detailed description and the accompanying drawing, in which.

Figure 20:
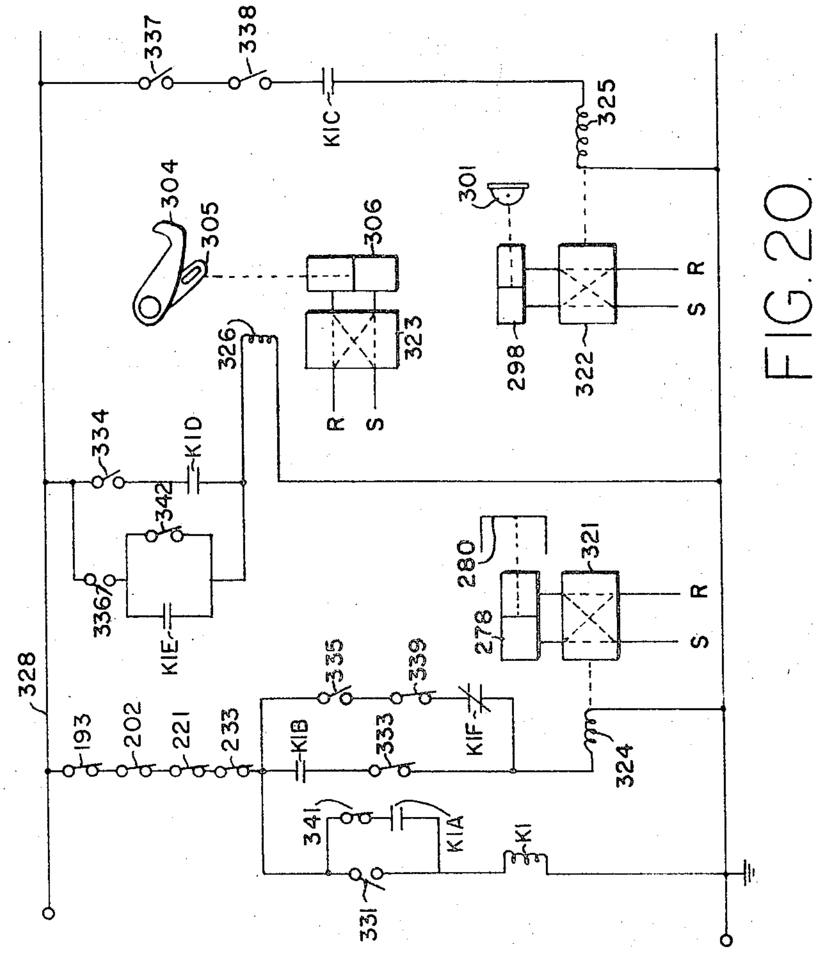
Figure 25:
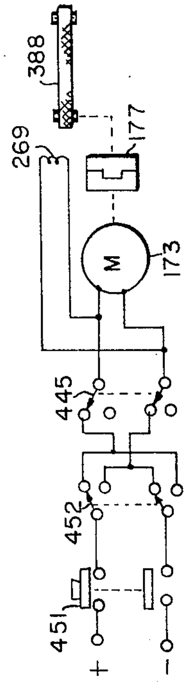
Figure 26:
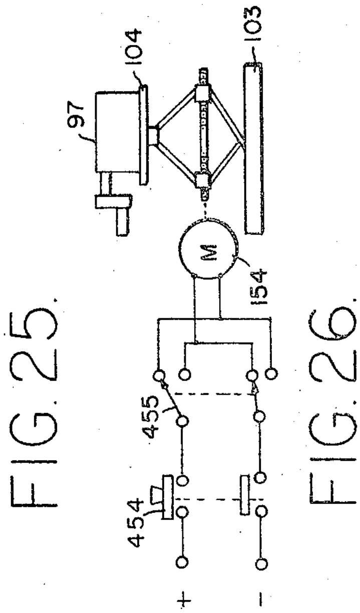
Figure 21:
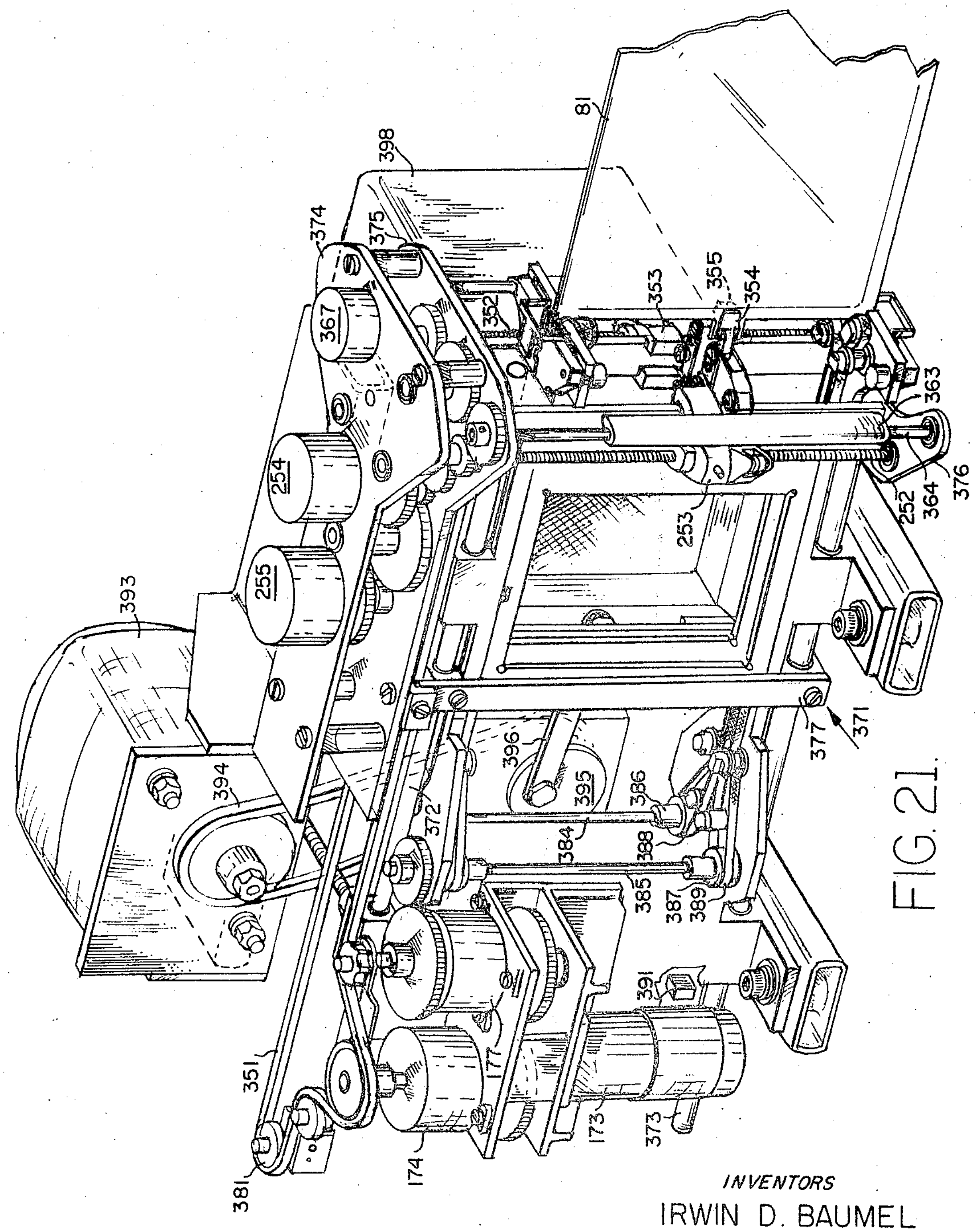
Figure 22:
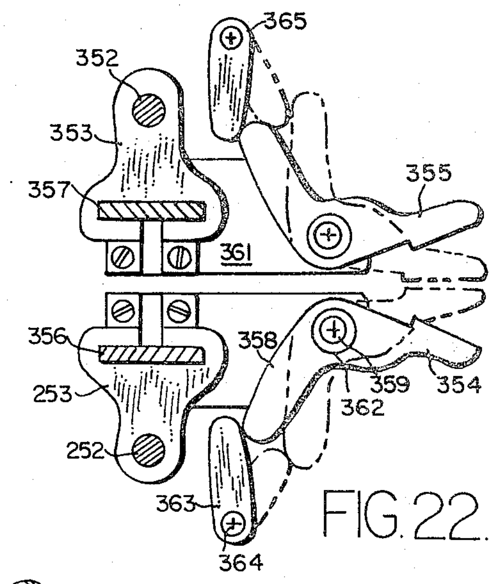
Figure 27:
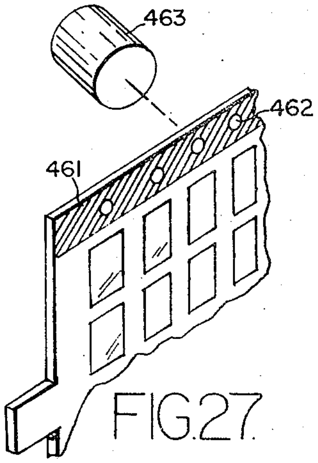
Figure 24:
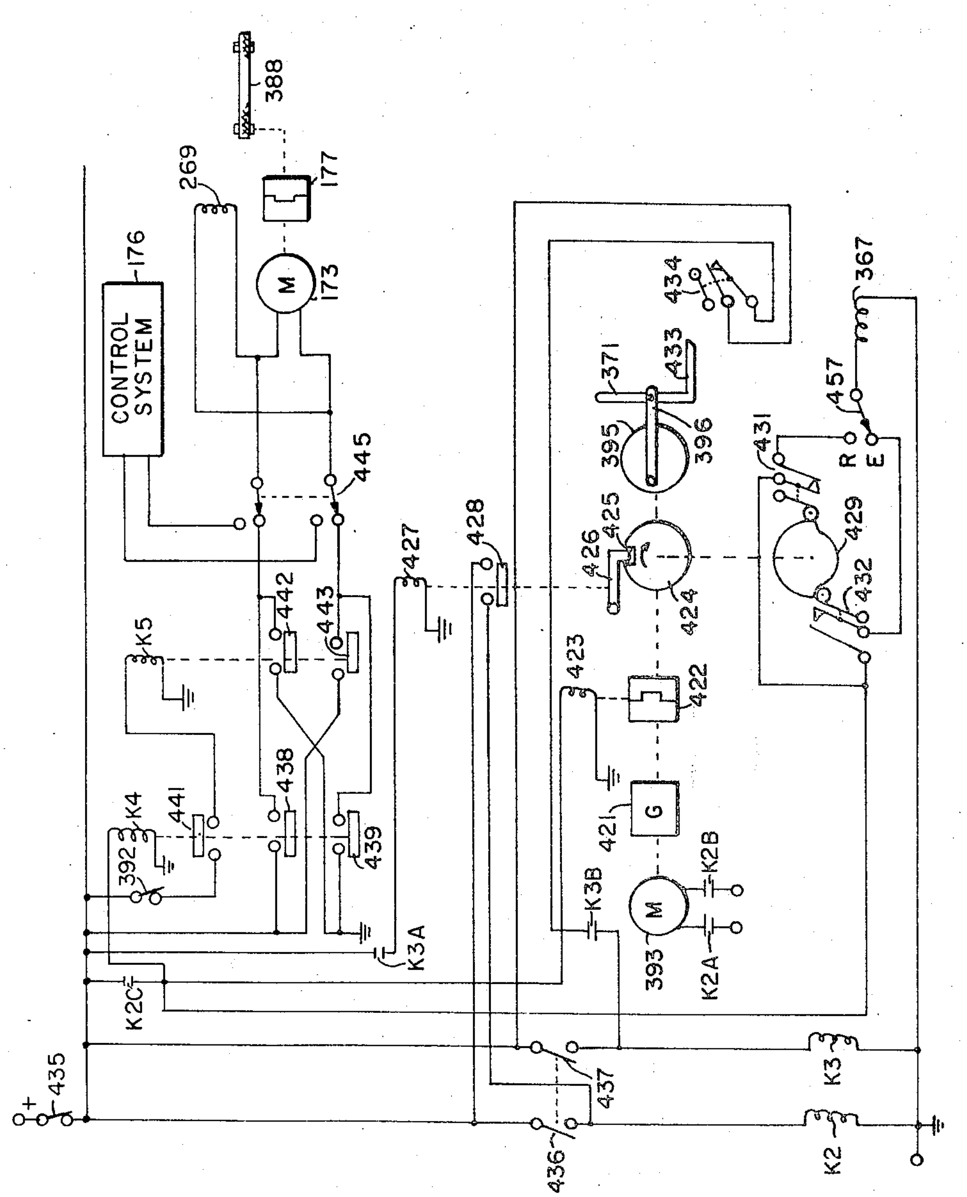

FIGS. **19*a* to 19*e*** inclusive are schematic views showing successive positions of a portion of the module withdrawal mechanism;

FIG. 20 is a schematic wiring diagram of the module withdrawal control circuit;

FIG. 21 is a perspective view of the record extracting mechanism;

FIG. 22 is cross section view, partly schematic, showing the actuating mechanism for the tab grasping fingers;

FIGS. 23*a* through 23*e* are schematic diagrams depicting the tab grasping fingers and related apparatus in successive positions;

FIG. 24 is a schematic wiring diagram of the control system for the record extracting mechanism;

FIG. 25 is a schematic wiring diagram of the control circuit for positioning the record horizontally;

FIG. 26 is a schematic wiring diagram of the control circuit for positioning the transducer platform vertically; and FIG. 27 is a fragmentary perspective view of a microform equipped with optical index marks, and its relation to a photosensitive device.

DESCRIPTION OF PREFERRED EMBODIMENT

Figures 1, 2:
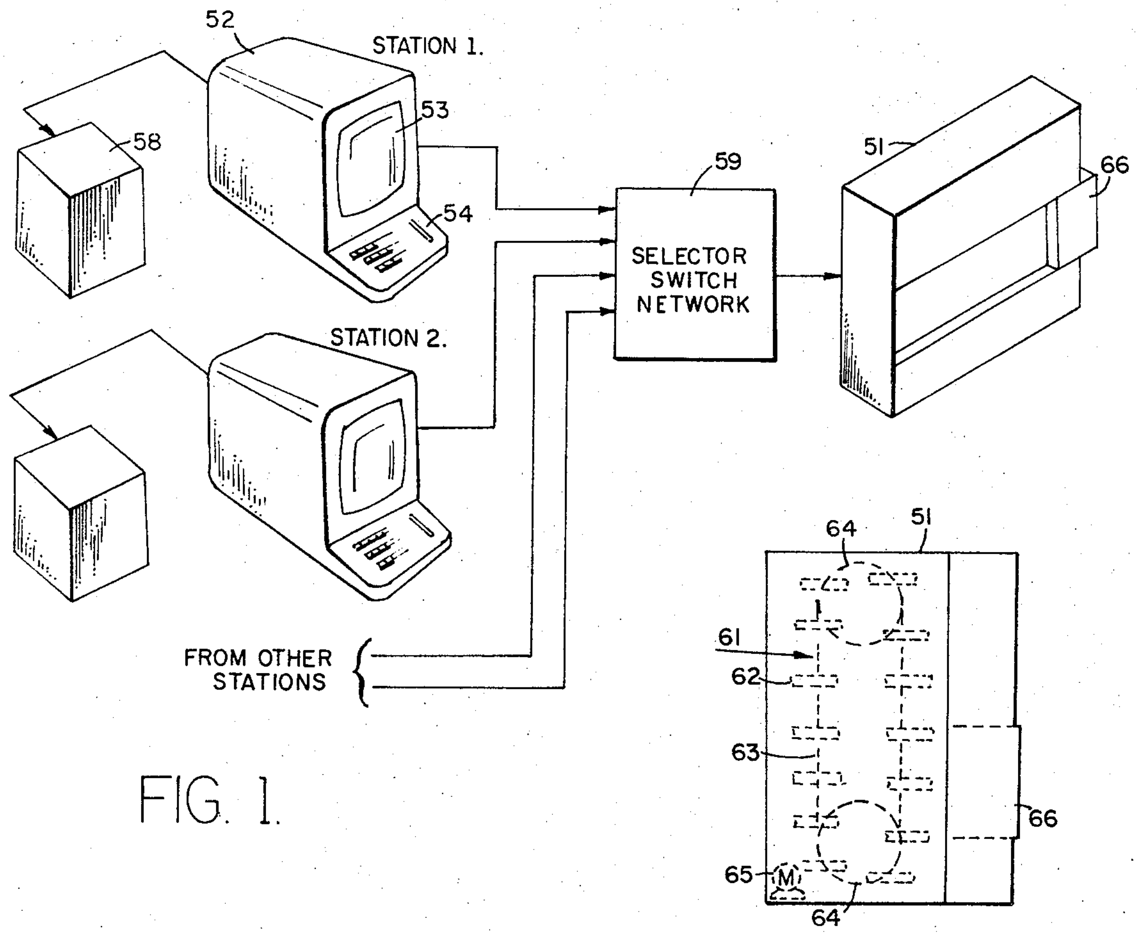
FIG. 1 is a schematic block diagram of an information storage and retrieval system incorporating the invention.
FIG. 2 is a schematic diagram of the central file.

The invention will be described for illustrative purposes with reference to a preferred embodiment in which any record may be selected and viewed at any of several remotely located stations. Referring first to FIG. 1, there is shown a central file 51 in which the information bearing records are stored. Any record may be selected and its content examined from any of several remotely located operating stations, two of which, stations 1 and 2, are shown. Station 1 is typical and includes a television monitor 52 having a viewing screen 53, a panel 54 including a keyboard, indicating lamps, display areas, etc., and also a buffer 58. The buffer may be any of several commercially available kinds such as a hard copy printer using an auxiliary cathode ray tube to form an image to be photographed, or one which stores and recirculates the video signal so as to "refresh" the image on the screen 53 or on its own screen. The details of the buffer 58 are not a part of the present invention and need not be further described.

Each operating station is connected to the central file 51 through a selector switch network 59 the purpose of which is to allow but one station at a time to have access to the file 51. The network also develops and transmits to each station signals indicating whether the file is busy or available. This network preferably comprises a bank of small multi-contact relays but alternatively may comprise a multi-section stepping switch or a logic network of solid state components.

An operator wishing to examine a record in the file determines its address from an index and, assuming the file is available is indicated by a suitable lamp on his panel, enters the address on his keyboard. In a manner to be more fully explained, the address is transmitted to the file where apparatus responds thereto by selecting the proper record, presenting it to the view of a television camera, and transmitting a video signal to the operating station whereby an image of the selected record appears on his screen. Also included is means controlled from the operating panel by which the various portions of the record may be scanned so that the pertinent one of the sixty or more images on the record may be examined. The panel also includes remote focus and magnification controls for the television camera. If the operator finds he needs to make an extended study of any item he can use the buffer to preserve the image on the screen or to make a hard copy, (depending on the type of buffer used) whereupon he may return the record to its storage location so that others may use the file.

As shown in FIG. 2, the central file 51 comprisea shelf assembly 61 including a plurality of shelves 62 each mounted for movement on a pair of endless tracks, one on each side of the file. the shelves are interconnected by chains 63 which pass over sprockets 64 and are operatively connected to an electric motor 65. Control mechanism is provided so that the motor 65 can drive the shelves around the tracks and stop them with a preselected shelf in an accessible, active position. Central files as briefly described above are well known and are available commercially from Diebold, Incorporated, Canton, Ohio. The present invention uses one of these files as an important element. The specific embodiment being described uses such a file having twenty shelves, each about eight feet wide. The records are stored on the shelves and the information on the records is retrieved by novel apparatus indicated generally at 66 in FIGS. 1 and 2 and which will be fully described.

Figure 3:
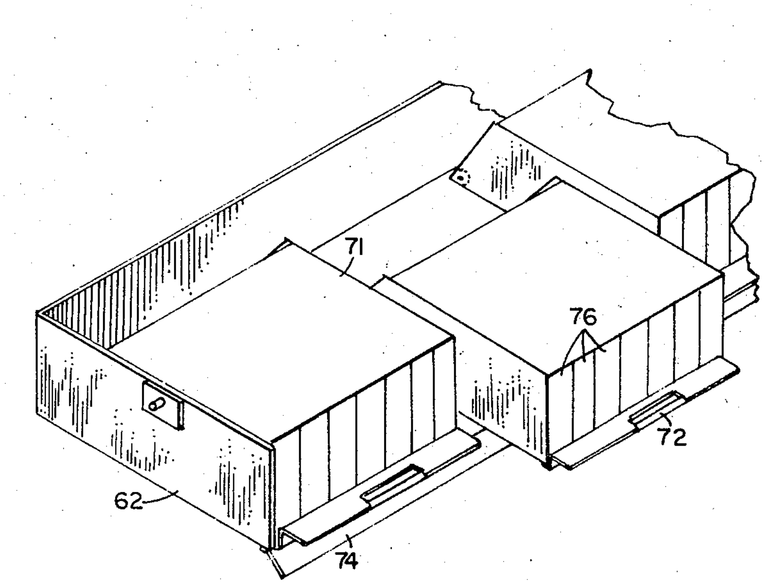
FIG. 3 is a perspective view of storage modules on a shelf.

Each shelf 62 supports seven record storage modules, such as the module 71 shown in FIG. 3. These modules are arranged beside each other on the shelf and each is a generally rectangular container with one open side. Each module is provided with a hinged handle 72 which is spring urged to an approximately horizontal position as shown but which may be swung downward out of the way when a record is to be extracted, as will be more fully explained. Each shelf is provided with a hinged lip 74 which, when the shelf is in its active position, is swung downward as shown to allow a storage module to be withdrawn but which is normally swung upward to retain the modules in place. As a selected shelf stops at its active position, the lip is automatically retracted to the position shown in FIG. 3.

Figure 4:
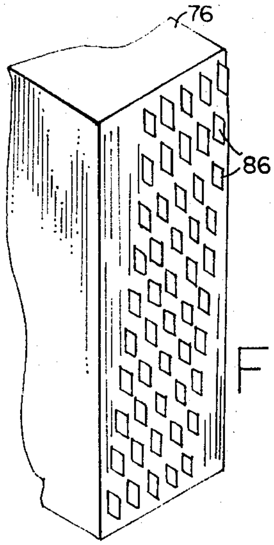
FIG. 4 is a fragmentary perspective view of a bin with records stored therein.

As shown in FIGS. 3 and 4, each storage module contains seven bins 76 which serve as dividers and supports for the records and each of which is essentially an open sided rectangular box. Each bin stores fifty records on edge.

Figure 5:
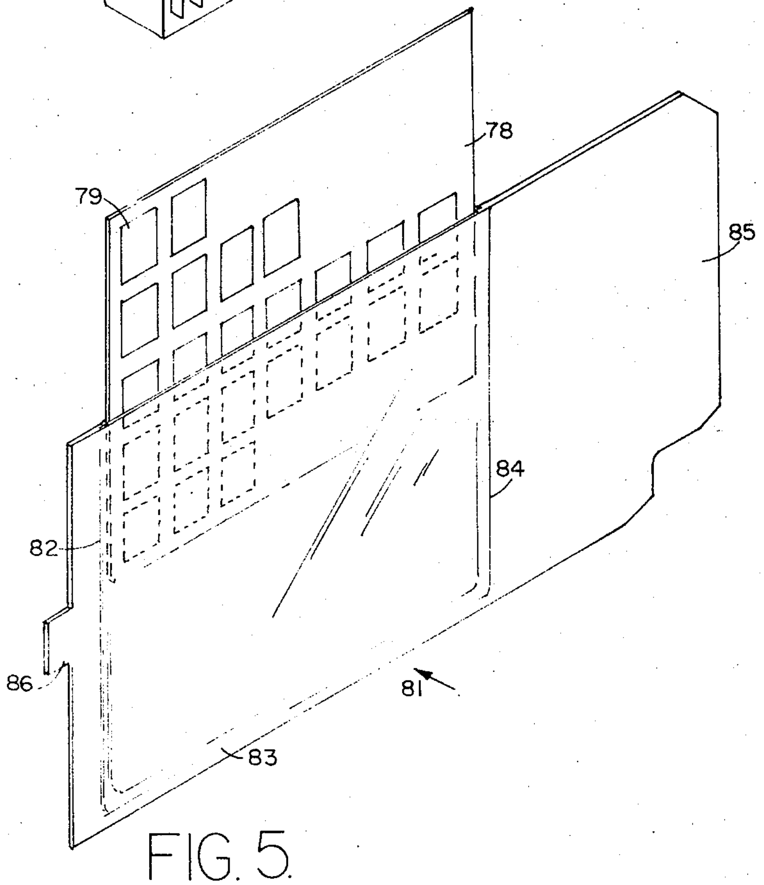
FIG. 5 is a perspective view of an information bearing record and its retainer.

As best shown in FIG. 5, each record in the embodiment being described is a generally rectangular sheet of film, or microfiche, 78 containing, for example, fifty information bearing images 79. Each microfiche is mounted in its own transparent retainer 81, preferably fabricated from two sheets of clear vinyl. The sheets are heat sealed along each side and the bottom as far inward as the lines 82, 83 and 84 thus forming a pocket, open at the top, into which the microfiche 78 is inserted. The retainer is formed on one side with a key portion 85 extending a significant distance beyond the pocket and the edge of the microfiche therein. More specifically, the key portion 85 extends from the line 84 to the right edge of the retainer, as viewed in FIG. 5. The other edge of the retainer is formed with a tab portion 86, which may be located in any one of ten positions along the edge. As best shown in FIG. 4, fifty retainers, each with its microfiche, are stored on edge in each bin with the key portions 85 inward and the tab portions 86 outward with each tab displaced one position from the next adjacent tab.

Figure 6:
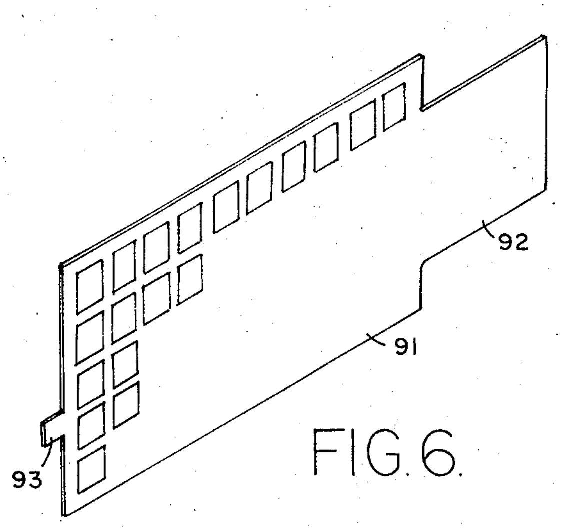
FIG. 6 is a perspective view of a modified form of record.

While it is preferred to provide retainers 81 as illustrated in FIG. 5, it would of course be possible to use a modified form of record 91 as shown in FIG. 6 wherein a key portion 92 is formed integrally on one edge thereof and a tab portion 93 on its other edge.

Figure 7:
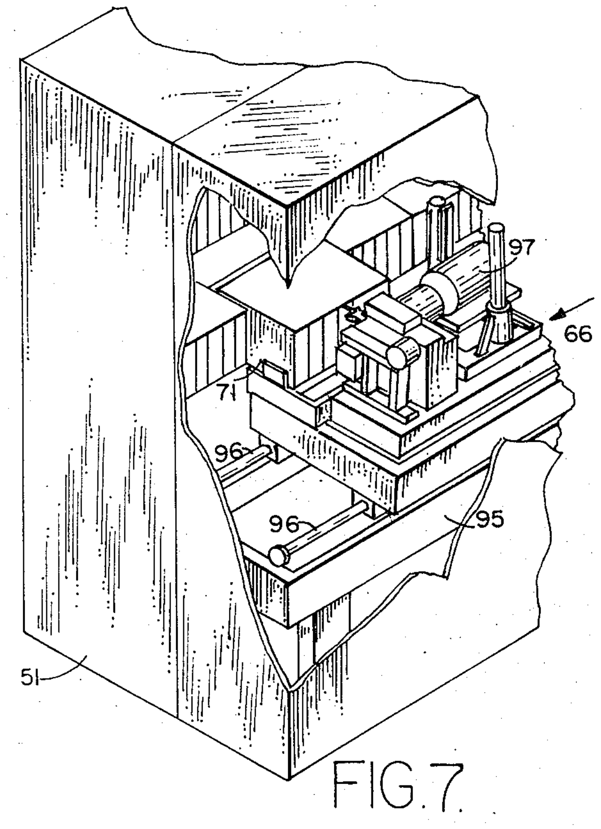
FIG. 7 is a fragmentary perspective view of the retrieval apparatus and the central file.

Referring now to FIG. 7, the record retrieval apparatus, indicated generally by the reference character 66, is mounted on a framework 95 beside the main part of the file 51. The retrieval apparatus comprises an assembly of platforms, to be more fully described, which are moveable as a unit along a pair of rods 96 which constitute tracks. The platforms are also moveable with respect to each other and carry various components including a mechanism for partially withdrawing a storage module from the shelf, a record extracting mechanism, and a television camera 97. When a signal identifying one of the records is received, the proper shelf is brought to the active position. At the same time, the platform assembly is moved as a unit to a position adjacent to the proper storage module. Simultaneously the various platforms move relative to each other so as to position the extracting mechanism, to be fully described, adjacent to the selected record. The proper storage module 71 is partially withdrawn from the shelf, as shown, and the selected record is partially extracted from the bin so as to place a part of the information bearing portion of the record in the field of view of the camera 97 while leaving at least the key portion of the retainer 81 (or of the record 91, if no retainer is used) in place between the next adjacent storage records.

Figure 8:
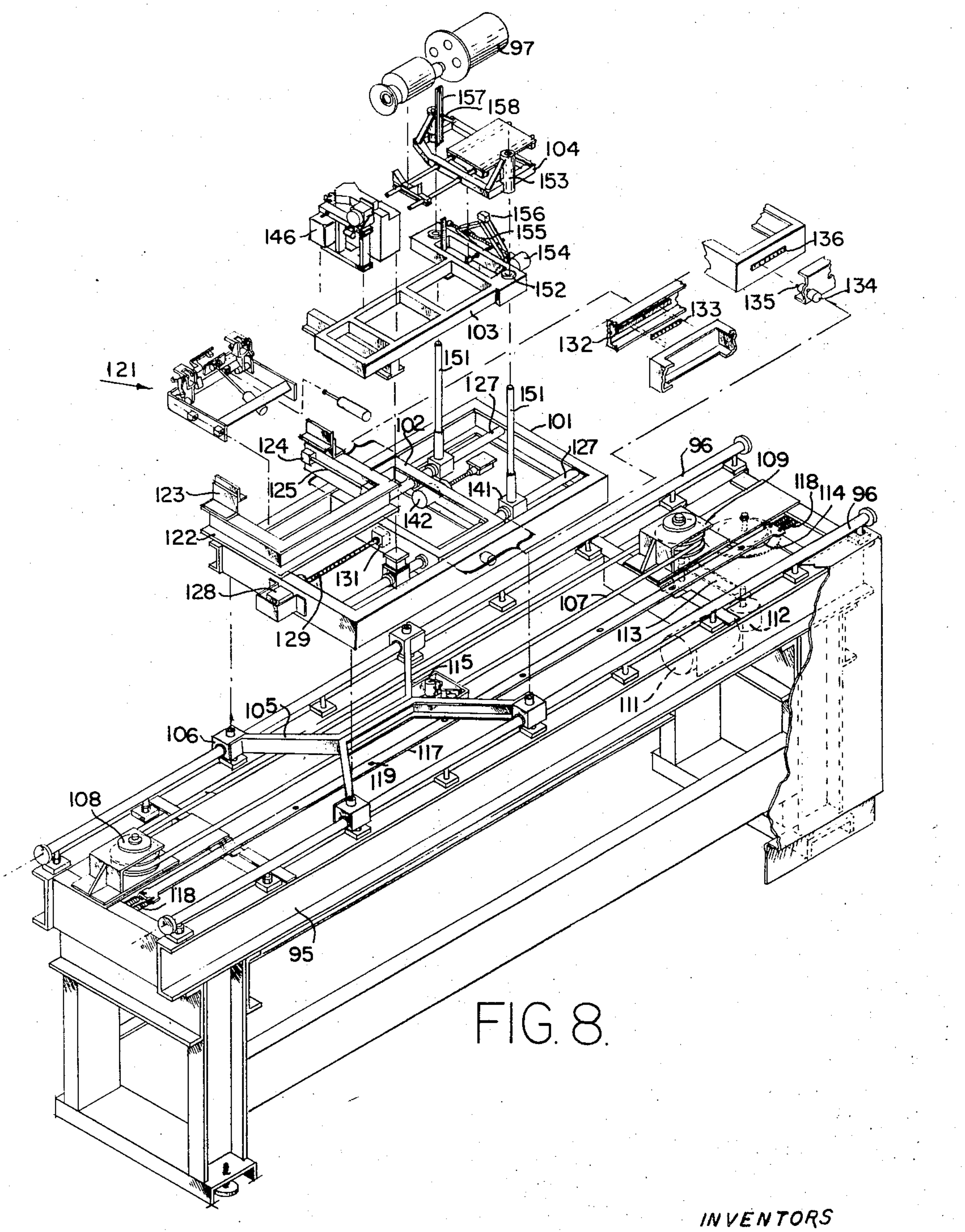
FIG. 8 is an exploded view of the retrieval apparatus.

Referring next to FIG. 8, the assembly of platforms previously mentioned comprises a storage module platform 101, an intermediate platform 102, a main platform 103, and a transducer platform 104. The storage module platform includes a frame 105 connected to four bushings 106 which embrace the rods 96 so as to permit longitudinal movement. A toothed belt 107 is connected to the frame 105 and passes over sprockets 108 and 109 the latter of which is driven by an electric motor 111 through gears 112 and a belt 113. A commutator 114, geared to the sprocket 109, is part of the control system for the motor 111, which system will be fully described. A solenoid 115 is operatively connected to a pin 116 (best shown in FIG. 12) which is spring urged downward into engagement with a bar 117 connected to the framework 95 by springs 118 at each end. The bar 117 is formed with seven holes, such as 119, of a size suitable to receive a pin 116, each corresponding to a position of the platform adjacent to one of the seven storage modules which rest on each shelf. The main portion of the storage module platform 101 is fastened to the four bushings 106.

A storage module withdrawing mechanism, indicated generally by the reference character 121, is fastened to the module platform 101. This mechanism 121 includes a generally U-shaped frame 122 which supports a group of four angle members 123, two on each side as shown which constitute a cradle for receiving the module. A pair of blocks, one of which is shown at 124, are fastened on the inside of one leg of the U-frame 122 and between them support one of a pair of rods 125 which serve as tracks for the carriage of the withdrawing mechanism 121, as will be more fully explained. Another pair of blocks on the other leg of the U-frame 122 support the other rod of the pair which serves as a second track.

The module platform 101 also supports a pair of longitudinally extending rods 127. The intermediate platform 102 is slideably supported on these rods for longitudinal movement. An electric motor 128 fastened to the storage module platform 101 is operatively connected to rotate a lead screw 129 which engages a nut 131 fastened to the intermediate platform 102. A commutator 132 fastened to the module platform 101 comprises two elongated conductive segments separated by a spacer made of insulating material. Seven brushes 133 fastened to the intermediate platform 102 engage the commutator 132. A solenoid 134 is operatively connected to a pin 135 which is spring urged into contact with the intermediate platform 102 in a region formed with seven apertures 136. The brushes 133, the commutator 132, the solenoid 134 and the pin 135 are part of a control system, to be fully described, which positions the intermediate platform at that one of seven positions corresponding to the selected one of the seven bins in the selected module.

The main platform 103 is fastened to four bushings 141 which are slideable on the rods 127. An electric motor 142 fastened to the intermediate platform 102 is operatively connected to rotate a lead screw 143 which engages a nut 144 (best shown schematically in FIG. 14) fastened to the main platform 103. The motor 142 is controlled by a system which will be described subsequently. The record extracting mechanism 146, to be fully described, is mounted on the platform and serves to grasp the selected record, or its retainer, and partially remove it from its storage position so that the information thereon may be read.

A pair of vertically disposed rods 151 are fastened to two of the bushings 141 and extend upward therefrom through bushings 152 in the main platform 103. Two elongated, vertically disposed bushings 153 are fastened to the transducer platform 104 and surround the rods 151 so that the transducer platform 104 moves longitudinally with the main platform 103 in a horizontal plane but can be moved vertically with respect to the main platform 103. An electric motor 154 fastened to the main platform is operatively connected to rotate a lead screw 155 which in turn is part of a "scissor" jack mounted on the main platform 103 with its pedestal 156 fastened to the transducer platformm 104 to raise and lower it. A vertically disposed multi-segment commutator 157 is mounted on the main platform and cooperates with a single brush 158 mounted on the transducer platform 104 for a purpose which will appear. In the present embodiment the transducer is the television camera 97 which is mounted on the transducer platform 104.

The various platforms so far described together with the apparatus mounted on them comprise a viewing station. In operation, the viewing station is moved to the proper position so that the selected module can be partially withdrawn from the shelf and the selected record may be partially withdrawn from the bin and placed within the field of view of the transducer 97. As will be more fully explained, the extracting mechanism can position the record in any of a plurality of horizontal positions so as to select the desired column of images while the transducer can be positioned vertically to select the proper row.

Figure 9:
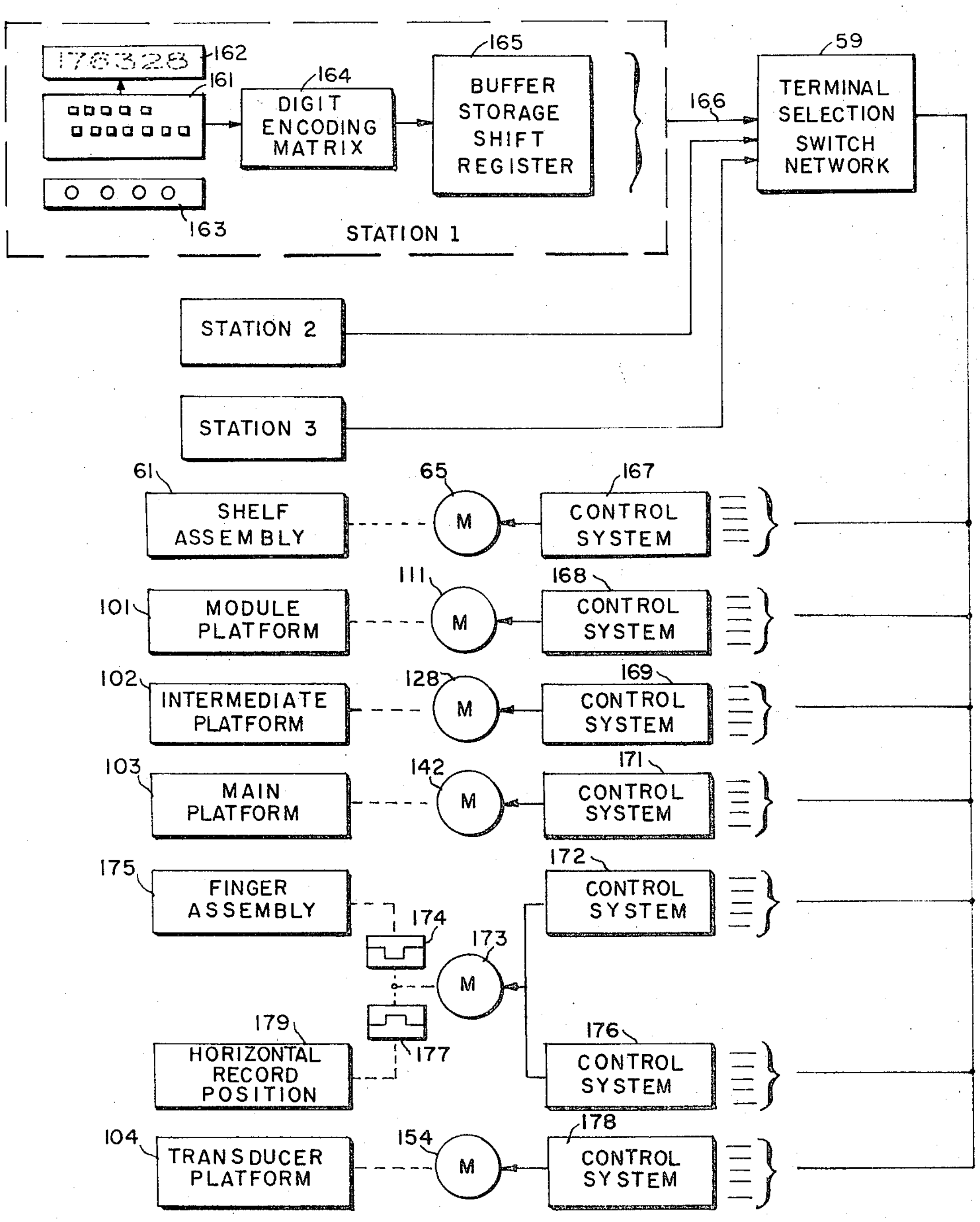
FIG. 9 is a schematic block diagram of the control and positioning systems.

Referring now to FIG. 9, Station 1 (and each of the other stations) includes a keyboard 161, a display 162 of the keys actuated, indicating lamps 163, a digit encoding matrix 164 and a buffer storage shift register 165. Let us assume that the operator wishes to view a microfiche stored on the 17th shelf, in the 6th module, in the 3rd bin, in the 28th position. Assuming the central file is available, as indicated by one of the lamps 163, he actuates keys 1, 7, 6, 3, 2 and 8 successively. As the first key is actuated a suitable electrical representation thereof is applied to the matrix 164 which derives a binary signal indicative of that digit. This binary signal is passed to and stored in the register 165. As additional keys are actuated, appropriate binary signals are generated and stored until all five digits are stored. The operator checks the display 162 to verify the address encoded and then operates an actuating key which connects the register 165 to a cable 166 which transmits the coded address in parallel form to the network 59 and thence to the central file.

The illustrative example assumes that they are twenty shelves each with seven modules, seven bins per module and fifty records per bin. This requires nineteen conductors for the encoding system described and a few additional conductors are provided for purposes which will appear. At the central file, the first six conductors, identifying the selected shelf, as led to a control system 167 which controls the motor 65 to bring the 17th shelf to the active position. Conductors numbers 7 through 9 are connected to a control system 168 which controls the motor 111 to drive the module platform 101 to the sixth module. Conductors 10 through 12 are connected to a system 169 which controls the motor 128 to drive the intermediate platform 102 to the third bin. Conductors 13 through 19 are connected to a system 171 which controls the motor 142 to drive the main platform 103 to position the extracting fingers (to be described subsequently) horizontally beside the 28th microfiche. Conductor 16 through 19, which identify the second digit of the microfiche number, are also connected to a system 172 which controls a motor 173 and a clutch 174 to position the extracting finger assembly 175 vertically opposite the appropriate tab. Conductors 20 through 22 are connected to a control system 176 which also controls the motor 173 and a clutch 177 to position the selected record horizontally by the mechanism 179. Conductors 23 through 25 are connected to a control system 178 which controls the motor 154 to position the transducer platform 104 vertically. Each of the various control systems will be more fully described.

Figure 11:
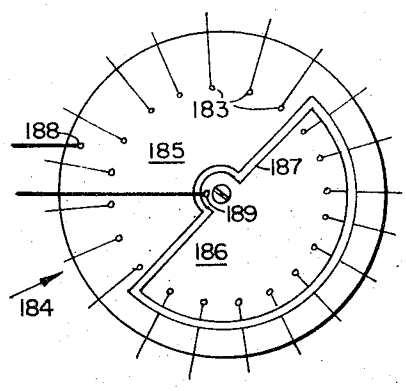
FIG. 11 is a schematic diagram of the commutator and brushes used in the system of FIG. 10.
Figure 10:
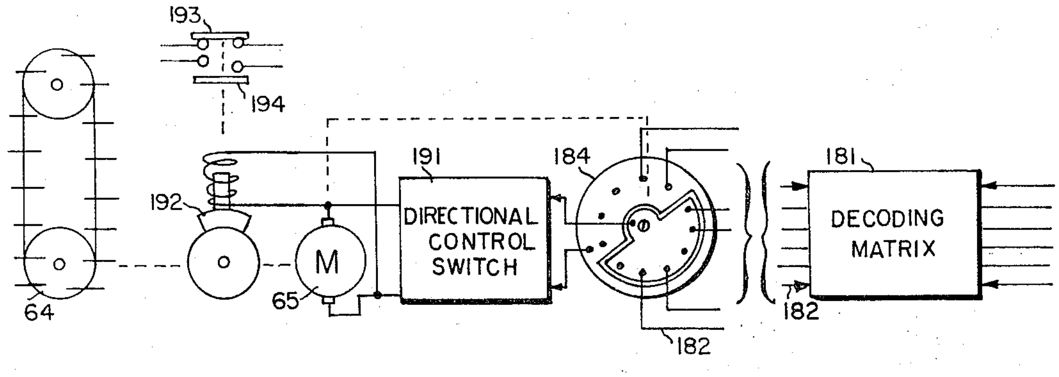
FIG. 10 is a schematic diagram of the shelf motor control system.

Referring now to FIG. 10, the first six conductors, collectively bearing a signal indicative of the selected shelf, are led to a decoding matrix 181 which places a voltage on one of 20 conductors 182, the 17th in the illustrative example. As best shown in FIG. 11, each of these conductors is connected to one of 20 brushes 183 equally spaced around a circle and engaging a direction controlling commutator 184. The commutator 184 comprises a first generally circular conductive disc 185 with a portion cut away to accomodate a second generally semicircular disc 186 of slightly smaller radius and separated from the disc 185 all around by a strip of insulation 187 and including a hub portion at the center. As shown, the 20 brushes are positioned so that each one engages either the disc 185, the disc 186 or the insulating strip 187, depending upon the angular position of the commutator 184. The commutator 184 is mechanically connected to the motor 65 with appropriate gearing so that its angular position is an indication of which shelf is at the active position. Two additional brushes 188 and 189 are positioned to engage the discs 185 and 186 respectively regardless of the angular position of the commutator.

The commutator 184 controls both the energization and the direction of rotation of the motor 65 so as to bring the selected shelf to the active position by the shortest route. It is obvious from FIG. 10 that the energized one of the 20 conductors 182 will energize the brush 188 or 189 depending on the angular position of the commutator and therefore depending on the direction of the selected shelf from the active position. The brushes 188 and 189 are connected to a direction control switch 191 which applies to the motor 65 a voltage the polarity of which depends upon which of the input conductors is energized. The motor 65 is the kind whose direction of rotation is determined by the polarity of the applied voltage.

Summarizing, the code on conductors 1–6 causes the matrix to place a voltage on one of the twenty conductors which, through the commutator 184 and switch 191, energizes the motor 65 to run in the proper direction at the same time lifting the spring applied, electromagnetically released brake 192. When the selected shelf substantially reaches the active positions, the energized brush engages the insulating strip 187, thus deenergizing the motor and allowing the brake to drop. The brake 192 also actuates contacts 193 and 194 for purposes which will appear.

Figure 12:
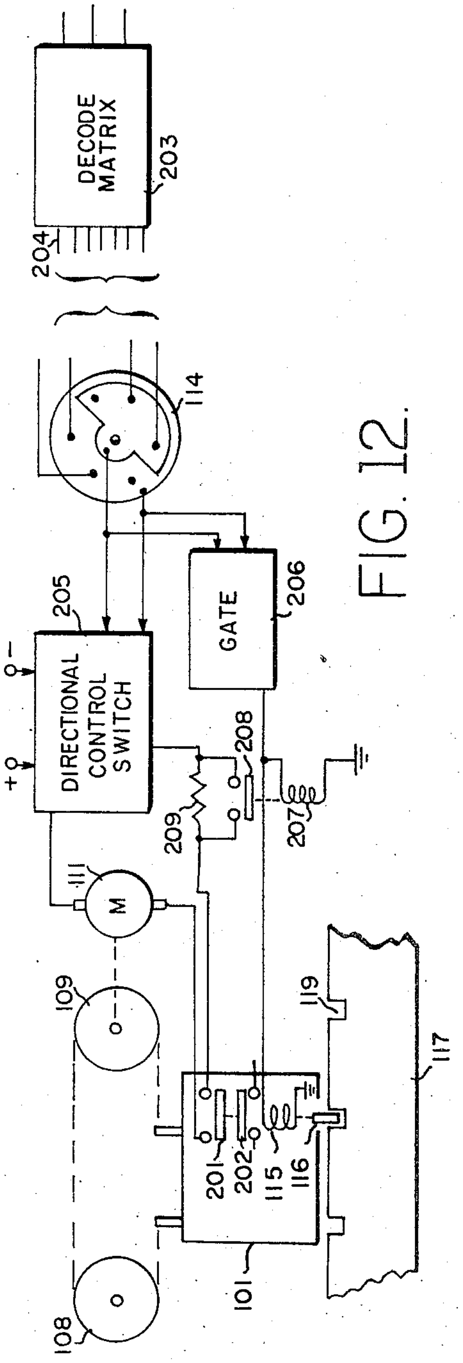
FIG. 12 is a schematic diagram of the storage module platform motor control system.

Referring now to FIG. 12, there are shown schematically some parts previously described including the storage module platform 101, the drive motor 111, the sprockets 108 and 109, the toothed belt 107, the solenoid 115 and the bar 117. As previously mentioned, the solenoid 115, when energized, picks up a pin 116 which cooperates with holes 119 in the bar 117 to position the platform. Energization of the solenoid 115 also closes the normally open contacts 201, and opens the normally closed contacts 202.

The seventh, eighth and ninth conductors are connected to a decoding matrix 203 which energizes one of seven output conductors. These conductors in turn are connected to seven brushes which engage a commutator 114 similar to the commutator 184 previously described and which serve the same purpose which is to control the direction of rotation of the motor 111 through the directional control switch 205. In addition, the two conductors connected to the output of the commutator 114 are also connected to a gate circuit 206 (similar to a logical OR circuit) which has an output when there is a voltage on either input conductor. The output of the gate 206 is connected to the solenoid 115 and also to the relay 207 which, when energized, closes contacts 208 thereby short circuiting a resistor 209 in series with the motor 111.

In operation, the presence of a signal on the seventh, eighth and ninth conductors operates through the matrix 203, commutator 114 and switch 205 to place an output of one polarity or the other on the output conductors of the switch 205. These conductors are connected to the motor through the resistor 209 of the contacts 201. At the same time, relay 207 and solenoid 115 are energized thereby pulling the pin 116 out of the hole 119, closing contacts 201, and short circuiting resistor 209 so that the motor runs in the proper direction at full speed. When the selected position (the sixth module) is approached, the energized brush will engage the insulating strip on the commutator 114 thereby dropping out the relay 207 and inserting the resistor 209 in the motor circuit so that the motor runs slowly. At the same time, the solenoid 115 is deenergized so that its pin 116 rests on the surface of the bar 117, ready to drop in the hole and stop the platform at the proper position. The previously mentioned springs (not shown in FIG. 39) cushion the shock of stopping. The contacts 202 are used in a control circuit to be discussed.

Figure 13:
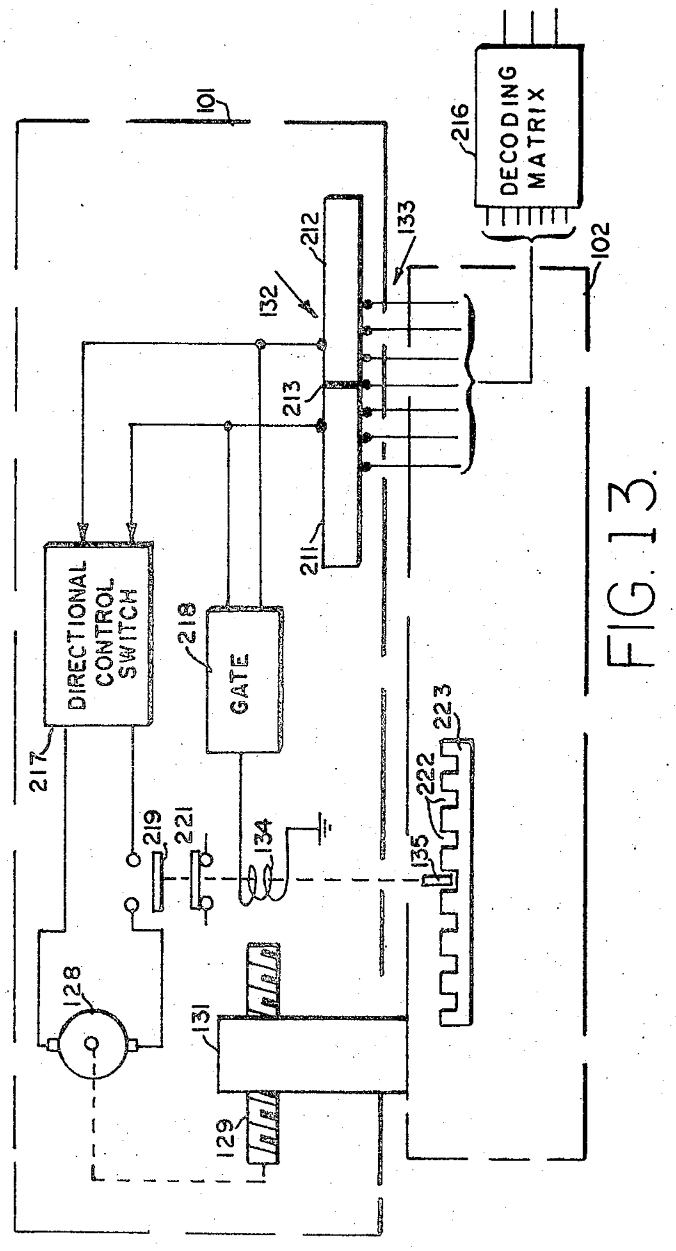
FIG. 13 is a schematic diagram of the intermediate platform motor control system.

FIG. 13 shows the drive mechanism for the intermediate platform which is quite similar to the previously described drive mechanisms except that the commutator 132 instead of being circular, is linear and comprises two conductive segments 211 and 212 separated by a short insulating segment 213, all mounted on the module platform 101. Seven brushes 133 mounted on the intermediate platform 102 cooperate with segments 211, 212 in the same way as the brushes and segments previously described.

The mechanism operates in much the same way as those previously described in connection with FIGS. 10 and 12. The motor 128 drives the lead screw 129 which engages the nut 131 fastened to the intermediate platform 102. The energization of the motor 128 is controlled by the decoding matrix 216, the commutator 132, a directional control switch 217, a gate 218, and contacts 219 as in the other drive mechanisms. A signal on the 10th to 12th conductors operates through the decoding matrix 216, the commutator 132 and the gate 218 to energize the solenoid 134 thereby closing contacts 219, opening contacts 221 (to be later explained) and raising the pin 135 out of engagement with one of the seven apertures or slots in the portion 223 of the intermediate platform 102. The motor 128 is energized to run in the proper direction to move the platform 102. A single speed drive is adequate for this application. As the selected bin is approached, the energized conductor on the commutator engages the insulating strip 213 thereby dropping the pin 135 and deenergizing the motor.

Figure 14:
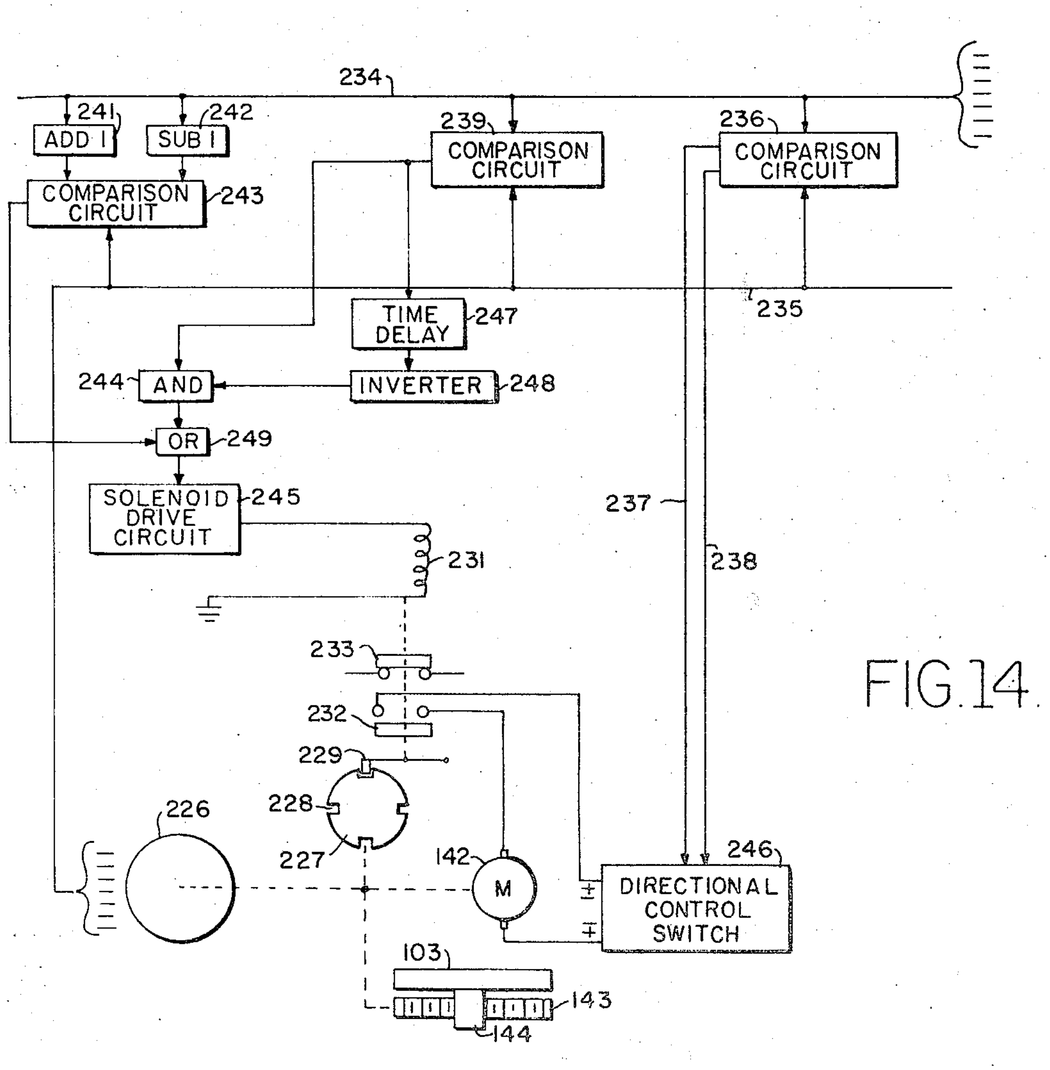
FIG. 14 is a schematic diagram of the main platform motor control system.

FIG. 14 shows the control system for positioning the main platform so that the extracting fingers are opposite the selected one of the fifty records stored in the bin. More precise positioning is required here than is required for positioning the main and intermediate platforms and therefore a more refined system is used.

The motor 142, mounted on the intermediate platform 102, drives the main platform 103 through the lead screw 143 and nut 144 as previously mentioned. A "binary decimal" encoder 226 is operatively connected to the drive mechanism and generates a binary decimal output representative of the linear position of the platform 103. The encoder may be any of several kinds of analog to digital converter such as a code wheel of conductive and non-conductive segments read by brushes or of transparent and opaque segments read by light sensitive elements. It is only necessary that it generate a digital output, of the same nature as that on the conductors 13–19, indicative of platform position.

A disc 227 having several slots 228 in its edge is also connected to the drive mechanism. Suitable gearing is selected so that the disc 227 rotates the angular distance between adjacent slots as the platform moves the distance between adjacent records. A pawl 229 cooperates with the disc 227 and may be raised by energization of a solenoid 231 which simultaneously closes contacts 232 and opens contacts 233.

The 13th through the 19th conductors, encoded with the desired address are connected to a cable 234 while the output of the encoder 226 representing actual platform position, is connected to the cable 235. A comparison circuit 236 is connected to the cable 234 and 235 and places an output voltage on conductor 237 only if the number representing the desired address is greater than the number representing the actual platform position and places an output voltage on conductor 238 only if the desired address is less than the actual position. Another comparison circuit 239 is also connected to the cables 234 and 235 and generates a "one" output, that is, a voltage, if the inputs are not equal, and generates a "zero" output or no voltage, when they are equal. A circuit 241 connected to the cable 234 adds one, that is, generates an output greater than the input by one digit while a circuit 242 subtracts one, that is, generates an output less than the input by one digit. The circuits 241 and 242 are connected to another comparison circuit 243 which is also connected to the cable 235. This comparison circuit generates a "one" output whenever the platform is displaced from the desired address by more than one place and generates a "zero" output (no voltage) when the platform is "within the window", that is, when the platform is at or within one space of the desired address.

At the start of operations, a coded indication of the desired record within the bin appears on conductors 13 to 19 and on the cable 234. Assume first that the platform is, by chance, already at the desired location. The comparison circuit 236 then has no output, although even if it did, it would be immaterial. The comparison circuit 239 has a "zero" output which makes the output of the AND circuit 244 "zero". The comparison circuit 243 likewise has a "zero" output. This output, and the output of the AND circuit 244 are both connected to the OR circuit, which, accordingly, has a "zero" output. The drive circuit 245 and the solenoid 231 remain unenergized, the motor 142 does not rotate, and the platform 103 remains where it is.

Next, assume that at the start of operations the platform 103 is just one space away from the desired address. The comprison circuit 236 then places an output on the appropriate one of conductors 237 or 238 which causes the directional control switch 246 to select the proper polarity for the motor 142 to run in the proper direction. The comparison circuit 239 has a "one" output which is applied to the AND circuit 244 and to a time delay circuit 247. The latter initially has a "zero" output which is inverted by the circuit 248 to a "one" and applied to the AND circuit 244. Therefore, the output of the AND circuit is "one" which is applied to the OR circuit 249 whose output is also "one" and which is applied to the solenoid drive circuit 245 whose function is to respond to a "one" signal by applying power to energize the solenoid 231. As a result, the pawl 229 is raised, the contacts 232 are closed, the motor 142 rotates and the platform moves. At the same time the circuit 247 is timing out. It is designed to have a delay less than the time required to move the platform one space. When the circuit 247 has timed out, its output becomes "one" which is inverted to "zero" by the circuit 248 and applied to the AND circuit 244. This deenergizes the solenoid 231, allowing the pawl 229 to rest on the rim of the disc 227. The contacts 232 remain closed and the motor 142 remains energized until the pawl 229 drops into the next slot in the disc 227. During all of this time the comparison circuit 243 had an output of "zero" and therefore had no effect on the operation.

Assume next that at the start of operations the platform 103 is more than one space away from the desired address. The comparison circuits 236 and 239 have outputs as above and the motor is energized. However, the comparison circuit 243 now has a "one" output which is applied to the OR circuit so as to retain the solenoid 231 energized and the motor 142 running even after the circuit 247 has timed out. When the platform arrives within one space of the desired address, the output of circuit 243 becomes "zero" thereby deenergizing the solenoid 231 and allowing the pawl 229 to fall to the rim of the disc 227 so as to enter the next slot 228 and stop the platform 103 at the desired position.

Figure 15:
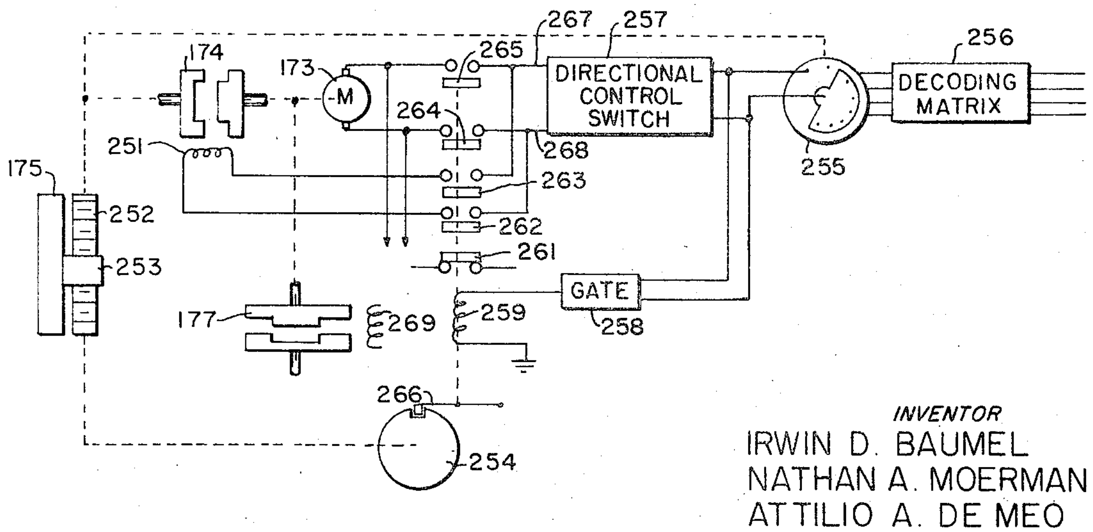
FIG. 15 is a schematic diagram of the finger assembly vertical positioning system.

Referring now to FIG. 15, the tab engaging finger assembly is shown schematically by the block 175. This assembly is adjusted vertically, so that the fingers can engage the proper tab, by a motor 173 which is a part of the record extracting mechanism 146 (FIG. 8). The motor 173 is mechanically connected to the electromagnetically operated clutch 174 which is engaged by energization of the winding 251. The clutch 174 is mechanically connected to rotate a lead screw 252 which in turn engages a nut 253 fastened to the finger assembly 175. The clutch 174 and lead screw 252 are also mechanically connected to a slotted disc 254 and to a commutator 255. The disc 254 is formed with a single slot and is connected through appropriate gearing so as to make one revolution as the finger assembly moves the center to center distance between adjacent tabs. The commutator 255 is similar to those previously described. A set of 10 brushes for the commutator 255, a decoding matrix 256, a directional control switch 257, a gate 258, a solenoid 259, contacts 261, 262, 263, 264, and 265 and a pawl 266 complete the control system which operates in much the same way as the control systems previously described. It is to be noted that the 16th through the 19th conductors, which are connected, along with conductors 13 – 15, to the cable 234 of FIG. 14, are also connected to the matrix 256 since they identify the second digit of the microfiche number and therefore identify the vertical position of the tab of the selected microfiche retainer. The 10 conductor output of the matrix 256 is connected to the commutator 255 which controls the directional control switch 257 so as to energize the conductors 267 and 268 with the proper polarity to cause the motor 173 to rotate in the proper direction. As before, the two output conductors from the commutator 255 are connected to the gate 258 which energizes the solenoid 259 whenever either conductor is energized. However, in this case, the solenoid 259 controls many contacts. The contacts 264 and 265 connect both motor leads to the switch 257 while the contacts 262 and 263 connect both leads of the clutch winding 251 to the switch 257.

When a signal appears on the conductors 16–19, the decoding matrix 256 places a voltage on one of its ten output conductors which voltage is transmitted through the commutator 255 to the directional control switch 257 and the gate 258. The solenoid 259 raises its pawl 266 and closes contacts 262, 263, 264, and 265 so as to engage the clutch 174, and energize the motor 173 which rotates the lead screw 252 to raise (or lower) the finger assembly 175 until the enrgized one of the ten conductors from the matrix 256 engages the insulating segment whereupon the solenoid 259 is deenergized and the pawl 266 engages the edge of the disc 254 until it drops into the slot stopping the assembly 175 and deenergizing the motor 173 and clutch winding 251.

It is to be noted that the contacts 262, 263, 264, and 265 completely isolate the directional control switch 257 from the motor 173 and clutch winding 251 when the solenoid 266 is deenergized and the pawl 266 is in the slot. Also, another electromagnetically operated clutch 177 equipped with a control winding 269 is mechanically connected to the motor 173. This clutch 177, the isolation provided by the contacts 262, 263, 264, and 265, and the auxiliary contact 261, enable the motor 173 to serve as additional purpose, as will be fully explained.

Having described how the various platforms are positioned, consideration can now be given to how the selected record is brought into viewing position. This is done by first partially withdrawing the storage module containing the selected record.

Figure 16:
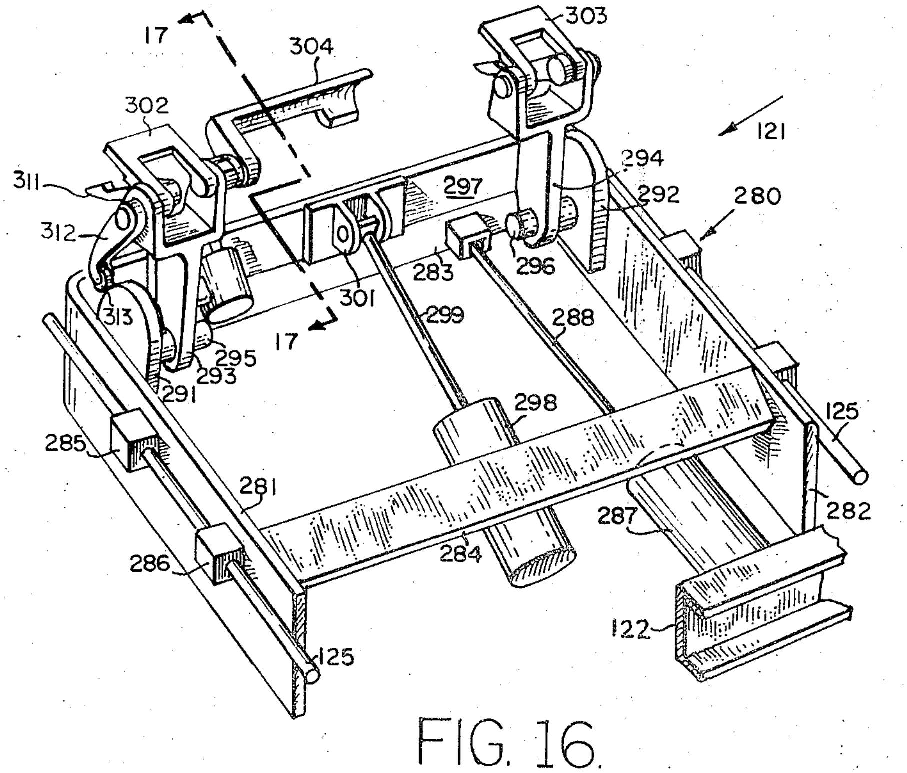
FIG. 16 is a perspective view of the storage module withdrawal mechanism.

Referring to FIG. 16, the module withdrawing mechanism 121 is essentially a moveable U-shaped carriage denoted generally by the reference character 280. A pair of flat bars 281 and 282 comprise the legs of the U while a bar 283 comprises the base. A cross piece 284 braces the ends of the U. A pair of bushings 285 and 286 are fastened to the outside of the bar 281 and two similar bushings (not clearly shown in FIG. 16) are fastened to the outside of the bar 282. These bushings surround the previously mentioned rods 125 (FIG. 8) which are the tracks on which the carriage slides. A pneumatic ram mechanism 287 is mounted on the U-frame 122 of the platform 101 and includes a piston rod 288 pivotally fastened to the bar 283.

Figure 17:
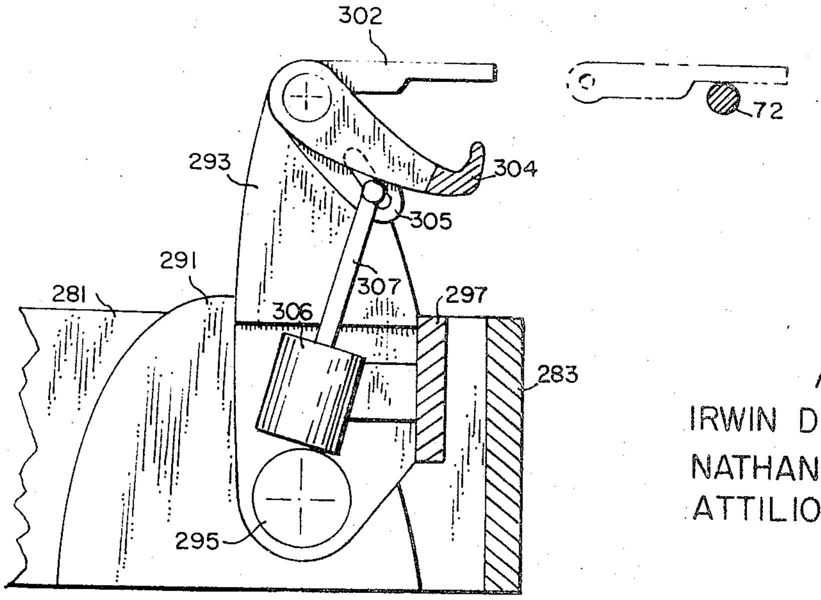
FIG. 17 is a fragmentary cross section view taken on the line 17-17 of FIG. 16.

A pair of cams 291 and 292 are rigidly fastened to the insides of the legs 281 and 282 near the base 283. A pair of upstanding yokes 293 and 294 are pivotally mounted on spindles 295 and 296 respectively which in turn are fastened to the cams 281 and 282 near the bottoms thereof. The yokes 293 and 294 are rigidly fastened together by a flat bar 297 which is parallel to but spaced from the base bar 283. A pneumatic ram 298 is mounted on the cross piece 284 and is provided with a piston rod 299 pivotally mounted to a yoke 301 fastened to the bar 297. Fastened to the tops of the yokes 293 and 294 are a pair of flat, generally horizontally extending bars, or pads, 302 and 303. A module withdrawing hook 304 is pivotally mounted on the inside of the yoke 293 near the top as shown. From its pivot point, the hook 304 extends forwrd (toward the module) and then toward the other yoke, as shown. As best shown in FIG. 17, an arm 305 is rigidly fastened, at an angle of 20 or 30 degrees, to the hook 304. A pneumatic ram 306 is mounted on the bar 297 and is provided with a piston rod 307 pivotally fastened to the arm 305 through a slot formed therein. When actuated, the ram 306 raises the hook 304 to engage the selected module, as will be more fully explained.

Returning to FIG. 16, a hook member 311 is pivotally mounted on the top of the yoke 293 and extends in the direction of the module to be withdrawn. An arm 312 is rigidly fastened to the hook member 311 at an acute angle, the magnitude of which depends on the proportions of the other parts and which, in the specific embodiment illustrated, is between 30 and 40 degrees. The arm 312 is provided with a roller 313 at its end which rests on the surface of the cam 291. A similar hook member, arm and roller (not clearly shown in FIG. 16) are mounted on the outside of the yoke 303 and cooperate with the cam 292. These members are for pulling the module onto its cradle and for swinging the handle 72 of the module downward and out of the way, as will be explained.

Figure 19A:
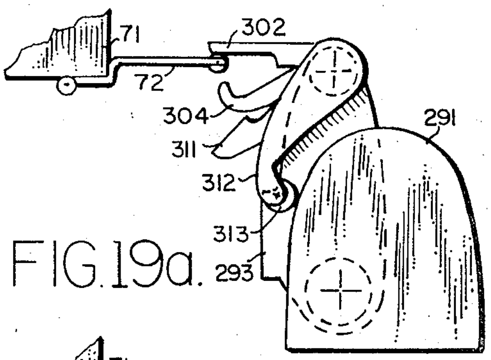
Figure 19B:
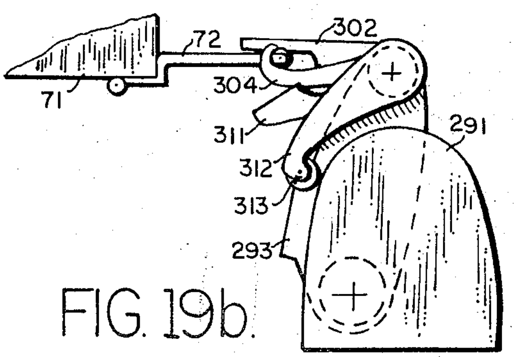
Figure 19C:
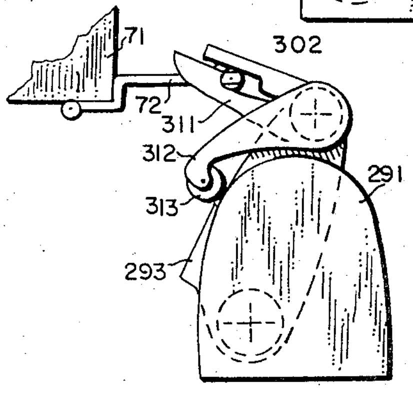
Figures 19D, 19E:
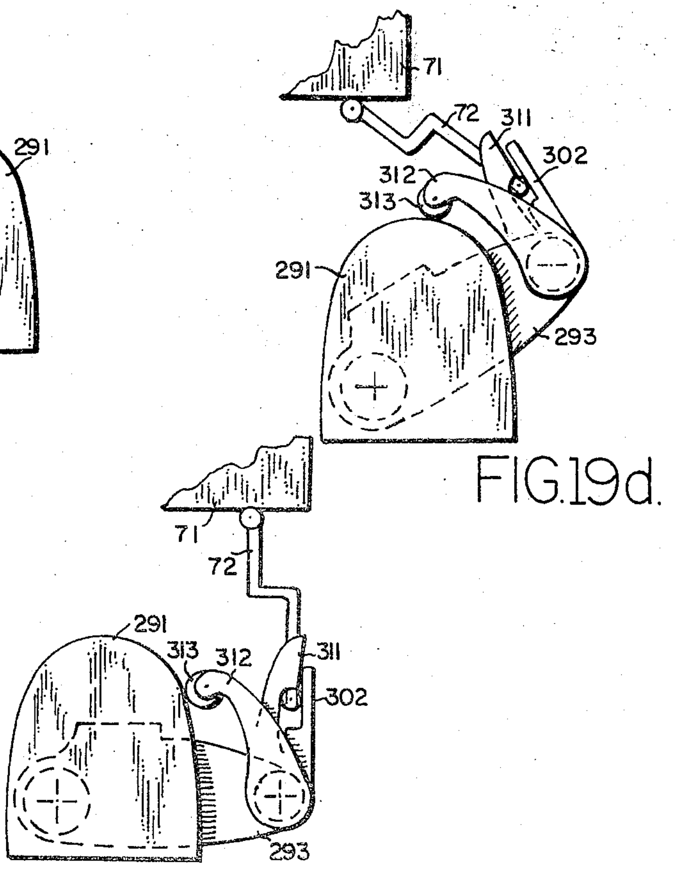
Figure 18:
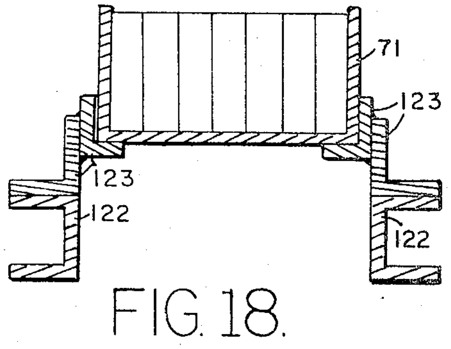
FIG. 18 is a cross section view of a storage module seated on its cradle.

In operation, after all of the platforms have been positioned, the ram 287 (FIG. 16) is actuated to advance the carriage 280 forward towards the selected module. The pads 302 and 303 slide over the top of the module handle 72. When the mechanism is fully advanced, the ram 306 (FIG. 17) is actuated to raise the hook 304 to grasp the handle 72 from the bottom. Then the ram 287 is reversed to withdraw the carriage 280 and the module 72. Next, the ram 298 is actuated to pivot the yokes 293 and 294 and the bar 297 about the spindles 295 and 296. This pivoting motion pulls the module 72 onto the cradle comprising the previously mentioned angle members 123 (FIG. 8) to the position shown in FIG. 18. At the same time, the handle 72 is swung from its horizontal position in front of the module to a vertical position, out of the way, so that a record may be extracted. This operation is best shown in FIGS. 19*a* to 19*e*. FIG. 19*a* shows, somewhat schematically, the positions of the parts just before the hook 304 is raised. FIG. 19*b* shows the position after the hook 304 has been raised. FIGS. 19*c* and 19*d* show intermediate positions of handle rotation. FIG. 19*e* shows the positions when the module is fully withdrawn onto its cradle and the handle retracted downward out of the way.

The module withdrawal operation proceeds as above described. The rams 287, 298 and 396 are controlled by various position indicating switches, relays, valves, etc., as shown schematically in FIG. 20 and described in connection, therewith. Each of the rams 287, 298 and 306 comprises essentially a cylinder, a piston, a piston rod and two inlet ports so that high pressure fluid from a supply can be directed to either side of the piston. These rams are controlled by valves 321, 322, and 323 respectively. Each valve is constructed and connected so as to selectively connect either port of its associated ram to supply pressure and the other port to the return line or reservoir indicated as S and R respectively. The valves are each spring biased to one position and actuatable to the other position by energization of control windings 324, 325 and 326 respectively.

When the shelf assembly 61, the module platform 101, intermediate platform 102 and main platform 103 have come to rest in their selected positions, the contacts 193, 202, 221 and 233 will be closed. Then the module withdrawal process may be started by momentarily closing switch 331, preferably by remote control from the operating station currently in use. Closure of this switch allows current to flow from the A.C. line 328 to the winding of the relay K1 which closes its contacts K1A, K1B, K1C, K1D and K1E and opens its contact K1F. The contact K1A holds winding K1 energized even although switch 331 be opened. Closure of contact K1B allows current to flow through the switch 333, which is closed until the hook 304 is raised and engaged, to the winding 324 thereby actuating valve 321 to direct supply fluid to the ram 287 to advance the carriage 280 of the withdrawing mechanism. When the carriage 280 reacts its full forward position, the switch 334 is closed thereby energizing winding 326, valve 323 and ram 306 to raise the hook 304 closes switches 335, 336 and 337 and opens switch 333. The latter deenergizes coil 324, reversing the fluid supply to the ram 287 whereupon the carriage is retracted. Although the switch is opened by retraction of the carriage, winding 326 remains energized through the switch 336 and the contact K1E. When the carriage is fully retracted, switch 388 closes, energizing winding 325 and actuating the valve 322 and the ram 298 to withdraw the module onto its cradle (comprising the previously mentioned angle members 123, FIG. 8) and to swing the handle 72 (FIGS. 3 and 19) downward to the vertical position. As the handle 72 leaves the horizontal position, the switch 339 opens, but this has no effect at this time since contact K1F is open. With the module on its cradle and the handle swung to the vertical position, out of the way, record extraction can proceed, as will be explained subsequently.

When the module is to be returned to the shelf, the push button switch 341 is opened momentarily, also preferably by remote control, thereby deenergizing relay winding K1 and opening contacts K1A, K1B, K1C, K1D and K1E and closing contact K1F. Opening of contact K1C deenergizes the winding 325 thereby, through valve 322, reversing the flow of fluid to the ram 298. The ram 298 swings the handle 72 to the horizontal position and pushes the module toward the shelf. When the handle is again in the horizontal position, the switch 339 is closed, thereby completing a circuit to the winding 324 which, through the valve 321 and the ram 287, causes the carriage to be advanced to its forward position, thus completing the return of the module to the shelf. As the carriage reaches its fully advanced, or forward position, the switch 342 opens, thereby deenergizing winding 326 and, through valve 323 and ram 306, causing the hook 304 to be disengaged from the module handle 72. As the hook 304 becomes disengaged, the switch 335 opens. The latter deenergizes the winding 324 thereby causing the carriage to be withdrawn. The apparatus is now in such a position that another module may be selected.

Referring now to FIG. 21, the previously mentioned motor 173 and clutch 174 drive a flexible member 351, shown schematically in FIG. 21 and which is preferably a roller chain. The chain 351 drives, through appropriate gearing, the previously mentioned commutator 255 and disc 254. The chain 351 also drives the previously mentioned lead screw 252 and also its twin, screw 352, which engages a nut 353. The fingers 354 and 355 are mounted on the nuts 253 and 353 respectively and are positioned vertically by the circuit previously discussed in connected with FIG. 15.

As best shown, somewhat schematically, in FIG. 22, the nuts 253 and 353 embrace vertical straps 357 and 358 respectively and are vertically slideable therealong. The finger 354 is formed with an arm 358 and is pivotally mounted on a pin 359 to a plate 361 which in turn is rigidly fastened to the nut 253. The finger 354 is urged by a spring 362 away from the finger 355, that is, clockwise as viewed in FIG. 22. An elongated cam 363 is mounted on a rod 364 in such a position that when it is rotated clockwise, as viewed in FIG. 22, the finger 354 will be pivoted toward the finger 355. The finger 355 is mirror image of the finger 354 and is similarly mounted and arranged to be moved toward the finger 354 by the counterclockwise rotation of an elongated cam 355. The two cams 363 and 365 are operated simultaneously in their respective finger closing direction by the energization of a rotary solenoid 367 (FIG. 21) operatively connected thereto.

The fingers 353 and 354 must be moved forward, that is, to the right as viewed in FIG. 21, toward the stored records so as to grasp the tab of the selected record between them and partially extract it from the file. In order to provide for this motion, the fingers and their actuating mechanisms are mounted on a moveable subassembly 371. This subassembly is slideably mounted on two rods 372 and 373 and includes the upper plates 374 and 375, the lower plate 376, uprights such as the member 377 and all the framework necessary to carry the fingers 353 and 354, the lead screws 252 and 352, the cams 363 and 365, the commutator 255, the disc 254, the solenoid 367 and the various gear trains. The chain 351 passes over an idler sprocket 381 which is spring urged to the left, as viewed in FIG. 21, so as to allow the right portion of the chain to move with the subassembly 371.

The motor 173 and the clutch 177, when engaged, rotate a pair of vertical rods 384 and 385 through a suitable gear train. These rods are each provided with two pulleys, one on top and one on the bottom. The two lower pulleys 386 and 387 are shown clearly in FIG. 21. Near the front, but not a pair of the subassembly 371, are two more vertical rods, each with two pulleys. The four lower pulleys are engaged by belts 388 and 389, which belts are side by side and arranged to frictionally grasp a record which may be thrust between them. The upper pulleys are engaged by similar belts. The belts withdraw the record a variable distance, depending upon which portion is to be viewed, as will be more fully discussed. However, the extent of withdrawal is positively limited by a mechanical stop 391 interposed in the line of travel of the record in such position that, with the record against the stop, the last column of images is in the field of view of the camera while the key portion 85 (FIG. 5) of the retainer (or the key portion 92, (FIG. 6) of the record, if no retainer is used), remains in place between adjacent retainers in the bin thereby preserving the integrity of the file and making sure that the retainer and record are returned to their proper place. The stop 391 is preferably resiliently mounted so as to avoid damage to a record striking it and so as to open a limit switch 392 (FIG. 24) when engaged by a record.

An electric motor 393 is mounted on the stationary framework and, through suitable gearing and a chain 394, drives a wheel 395 to which one end of a strap 396 is eccentrically attached. The other end of the strap 396 is pivotally fastened to the subassembly 371 and drives it forward and back as will be more fully explained.

Also shown is a light source 398 which provides the illumination necessary to enable the television camera 97 (FIGS. 7 and 8) to "read" the record.

Figure 23A:
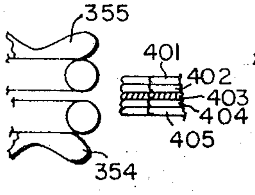
Figure 23B:
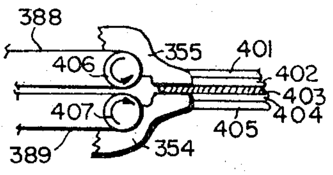
Figure 23C:
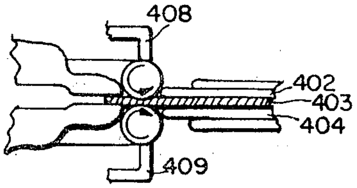
Figure 23D:
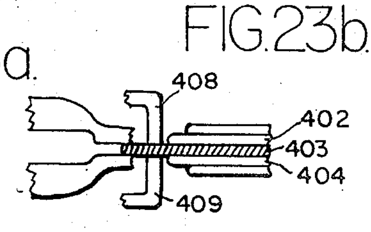
Figure 23E:
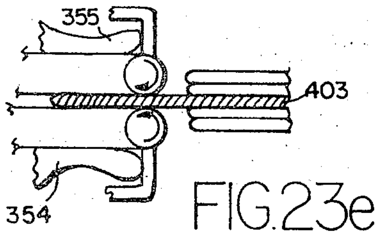

Referring now to FIG. 23A, the fingers 354 and 355 are shown, somewhat schematically, in the positions they occupy at the start of operations. Five records 401, 402, 403, 404, and 405 are shown schematically. The record 403 is shaded and depicts that record having its tab aligned with the fingers, which is to be partially extracted. When the motor 393 has advanced the subassembly 371 all the way forward, the fingers are closed around the selected tab as shown in FIG. **23*b*. At the same time, the motor 173, through the clutch 177, drives the belts 388 and 389 (and the other pair of belts as well) in a direction to oppose the movement of records into the apparatus. As the subassembly 371 is retracted, the record 403 is drawn between the idler rollers 406 and 407 and between the belts despite their motion in the opposite direction, as shown in FIG. 23*e*. If either or both of the adjacent records 402 and 404 should stick to the record 403 and tend to be withdrawn at the same time, they would encounter the reversely rotating idler rollers and belts, as shown in FIG. 23** *c*, and be repelled thereby.

A further precaution against having more than the selected record being drawn into the apparatus may be taken if desired. Such an additional precaution may comprise a "restrictive throat" including two elements 408 and 409 positioned just above the upper idler rollers and another similar pair positioned just below the lower idler rollers. It is again pointed out that FIGS. **23*a* to 23*e* are schematic, because the fingers, the rollers and the throat elements are vertically aligned, making it much more convenient, if not absolutely necessary, to resort to a schematic showing to explain their operation. Soon after the fingers 354 and 355 have started to retract, the elements 408 and 409 are moved inward so as to almost touch the record 403 as shown in FIG. 23*d*, thereby forming a restricted passageway, or throat, for this record and excluding the adjacent records. As the retracting motion of the subassembly 371 is completed, the belts are reversed in direction, the fingers are opened, and the throat elements are separated, as shown in FIG. 23*e*. The record 403 is then drawn into viewing position by frictional engagement of the belts 388 and 389.**

Referring now to FIG. 24, there is shown schematically the motor 393 connected to a gear box 421 which in turn is connected to a clutch 422 operated by a winding 423. The clutch 422 is operatively connected to a disc 424 and to the wheel 395. The disc 424 has a single slot 425 which cooperates with a pawl 426 which may be withdrawn by energization of a winding 427, at the same time closing a normally open contact 428. The disc 424 is also mechanically connected to a disc shaped cam 429 which has a switch operating portion extending over approximately one half of its circumference, as shown. Two switches 431 and 432 are arranged to be closed by the cam 429 during opposite halves of each revolution of the cam. Assuming clockwise rotation, the switch 431 is closed during the first half revolution while the switch 432 is closed during the second half revolution. The wheel 395, during each revolution, advances the subassembly 371 (which, it will be recalled, carries the tab grasping fingers) and then retracts it. A portion 433 of the assembly 371 engages and momentarily opens a switch 434 at approximately the position of farthest advance of the subassembly 371.

Assuming that the module has been withdrawn and seated properly with the handle swung out of the way, as indicated by the closure of switch 435, the extraction operation can be started by momentarily closing switches 436 and 437. These switches are preferably operated by remote control, manually or automatically, from the operating station. Closure of these switches energizes relay windings K2 and K3 which close their contacts K2A, K2B, K2C, K3A and K3B. Closure of contacts K2A and K2B energizes the motor 393. Closure of contact K3C energizes the clutch winding 423 and a relay K4. The latter is provided with two normally open contacts 438 and 439 which, when closed, connect a positive and negative voltage to the motor 173 with such polarity as to drive the belts, typified by the belt 388, in a direction to repel the records. The relay K4 is also provided with a normalyy closed contact 441 which, when closed, connects the positive voltage, through the limit switch 392, to the winding of a relay K5. The latter relay is provided with two normally open contacts 442 and 443 which, when closed, apply voltage of proper polarity to the motor 173 so as to drive the belts in a direction to draw a record into the apparatus.

Closure of contact K2C also applies a voltage to one terminal of each of the switches 431 and 432 for a purpose which will appear.

Closure of contact K3A energizes the winding 427, lifting the pawl 426 out of the slot 425 in the disc 424 and closing contact 428 which completes a holding circuit for winding K2 around the switch 436. Closure of contact K3B completes a holding circuit for winding K3 around the switch 437 through the switch 434.

As the motor 393, disc 424 and wheel 395 rotate, the subassembly advances. After approximately one half a revolution, maximum advance is reached and the switch 432 is closed thereby energizing the rotary solenoid 367 which, it will be recalled, operates the cams to cause the fingers to grasp the tab. At about the same time, the portion 433 engages and opens the switch 434, thereby breaking the holding circuit for relay K3 which opens its contacts K3A thereby deenergizing the winding 427. However, the pawl 426 rests on the edge of the disc 424 and the contact 428 remains closed. When the disc 424 and wheel 395 complete their revolution, the record has been drawn between the rollers and belts despite their reverse rotation. Then the pawl 426 drops into the slot 425, stopping the motion of the subassembly 371 and opening contact 428, thereby deenergizing winding K2. Opening of contacts K2A and K2B deenergizes the motor 393. Opening of contact K2C deenergizes the clutch winding 423 and the solenoid winding 367 (which is also deenergized by the opening of the switch 432). Opening of contact K2C also deenergizes the winding K4, opening its contacts 438 and 439 and deenergizing the motor 173. At the same time, contact 441 closes thereby energizing the relay K5 which closes its contacts 442 and 443 so as to apply a voltage to the motor 173 of such polarity as to drive the belts in a direction to draw the record into the apparatus until it engages the stop 391 (FIG. 21) and opens the limit switch 392. The record is then in such position that the last column of images is aligned with the field of view of the camera 97 while the key portion 85 of the retainer remains between the next adjacent stored records.

After the selected record has been positioned as above described, the particular image on the record may be chosen. A double pole double throw switch 445 is actuated, prefereably by remote control from the operating station, to transfer control of the motor 173 from the system above described to the control system 176 (previously mentioned in connection with FIG. 9). The latter system may take various forms, depending upon the nature of the stored information. In many cases, the operator may want to browse through the images to select the proper one or ones. In such a case a simple manual control such as shown in FIG. 25 and 26 may be used.

Referring to FIG. 25, the positive and negative terminals of a source of unidirectional voltage are connected through an on-off switch 451 to a polarity reversing switch 452 and from thence to two of the stationary contacts of the previously mentioned double pole throw switch 445, the movable arms of which are connected to the motor 173 and the clutch winding 269. The switches 445, 451, and 452 are located at or, preferably, controlled from the operating station. By simple manipulation of the switches 451 and 452, the belts, such as the belt 388, can be driven in either direction or stopped so as to adjust the horizontal position of the record.

The system for controlling the vertical position of the camera 97 is similar. As shown in FIG. 26 the positive and negative terminals are connected through an on-off switch 454 to a polarity reversing switch 455 and then to the motor 151 which, it will be recalled, drives a "scissor" jack on the main platform 103 so as to raise and lower the transducer platform 104 which carries the television camera 97: Manipulation of the switches 454 and 455, which preferably are controlled from the operation station, enable the camera 97 to be positioned vertically.

When a record is to be replaced in the file, it is first transported by manipulation of the switches 451 and 452 of FIG. 25, approximately to the position shown in FIG. 21 with the edge of the record just barely engaged by the belts and rollers. Then a single pole double throw switch 457, FIG. 24, is shifted from its "Extract" position to its "Return" position thereby connecting the solenoid 367 to the switch 431 instead of to the switch 432. The the switches 436 and 437 are closed momentarily and the subassembly 371 is advanced and retracted as before. However, the solenoid 367 is energized through the switch 431 to close the fingers 354 and 355 during the "Advanced" portion of the cycle and is deenergized when the subassembly is fully advanced and the record back in file so that the fingers release the record and remain open during retraction of the subassembly.

The selection of the particular image on the record has been described as largely manual. However, the control system can readily be adapted to automatic preselection. For this purpose, as shown in FIG. 27, each retainer has an opaque strip 461 across the top, broken only by tiny transparent spots 462, one centered above each vertical column of images. Horizontal position is sensed by a photoelectric sensor 463 and the information fed to a suitably modified control system 176 (FIG. 9). Vertical position of the camera can be sensed by the multi segment commutator 157 (FIG. 8) and brush 158 arrangement and the information fed back to a suitable control system 178 (FIG. 9). With such an arrangement, not only the particular record, but the particular image, can be preselected and displayed.

It is to be understood that an apparatus constructed in accordance with the invention and suitable for commercial use is a complex device and includes intricate mechanical, electric and logic elements and circuits. Many of the details of such an apparatus have been omitted from the present disclosure or shown in simplified schematic form in order to disclose more clearly the inventive concepts and to avoid obscuring the invention with engineering details.

From the foregoing it is apparent that applicants have provided an improved information storage and retrieval system. The records are stored in a central file safe from loss or damage. The individual retainers protect them from wear and tear. Any one of many thousands of records may be retrieved quickly and automatically. The tabs on the retainers facilitate manipulation of the records and the staggered arrangement of the tabs relaxes the requirements for precise positioning of the extracting mechanism. The key portion of the retainers protects the integrity of the file by marking the assigned storage locations while permitting the record to be fully exposed to view. When so exposed, not only may an image thereof be televised but by simply replacing the television camera with another appropriate transducer, the record may be photographed, directly imaged, projected, or duplicated. The information need not be recorded optically but may be otherwise recorded, for example, magnetically, in which case an appropriate form of transducer is provided to read the information.

Although a specific embodiment of the invention has been described in considerable detail for illustrative purposes, it must be realized that many modifications will occur to those skilled in the art. It is therefore desired that the protection afforded by Letters Patent be limited only by its true scope of the appended claims.

What is claimed is:

1. An information storage and retrieval system, comprising a central file, a plurality of information bearing records stored in said file, a record viewing station, means responsive to a signal identifying one of said records for transporting said viewing station to a position adjacent to said one record and for frictionally grasping and partially withdrawing said one record from its storage location in said file to a position at which information on said one record is exposed to view, said means including a pair of fingers between which said record is grasped and by means of which withdrawal is initiated, and means for reading information from said one record while in its aforesaid position.

2. An information storage and retrieval system in accordance with claim 1 in which said means for reading includes a television camera.

* * * * *